Patented Nov. 11, 1941

2,262,238

UNITED STATES PATENT OFFICE 2,262,238

SAUSAGE PREPARATION

August Kellermann, Chicago, Ill., assignor to Industrial Patents Corporation, Chicago, Ill., a corporation of Delaware No Drawing. Application November 10, 1939, Serial No. 303,862

4 Claims. (Cl. 99—169)

This invention relates to an improved method of curing unsmoked sausage.

One of the objects of this invention is to provide a method of securing improved flavor in unsmoked dry sausage.

Another object of this invention is to provide better color and surface appearance of unsmoked dry sausage.

Another object of this invention is to provide a dry sausage without the usual hard, shell-like rind.

Other objects of the invention will be apparent from the description and claims which follow.

The common practice in the curing of unsmoked dry sausage, such as the Italian type, is to mix curing ingredients with finely comminuted meat, and to stuff the mixture into casings. The individual green sausages are then hung in what is commonly known as "green rooms" where a temperature of 75 degrees to 80 degrees F. with a high relative humidity is maintained, and held in such rooms for 48 to 72 hours, depending upon the size of the sausage and type of casing. The individual sausages are then hung in a drying room in such a manner as to permit ready circulation of air around each, and held at a temperature of approximately 52 degrees to 54 degrees F. for 75 to 120 days for drying and curing, the length of time again depending upon the type of casing and size of the sausage. During this drying process it is necessary to release steam in the drying room from time to time to moisten the surface of the sausages in order to prevent complete drying of the outer surface prior to the time the inner portion was sufficiently cured and dried.

My invention comprises coating, as by dipping or spraying, the individual green sausages, in which the curing ingredients have been previously mixed, with some substance substantially impervious to moisture. A satisfactory substance is hot paraffin, heated to a temperature of approximately 200 degrees. This substance is permitted to set, and immediately the sausages are transfered to the standard drying room, where they are hung on racks to permit circulation of air around each sausage. The sausages remain in the drying room, which is held at ordinary drying room temperatures, until they are cured and dried. Sausages so coated may also be first held for a short period of time in the standard "green rooms," and then removed to the drying room, but this additional step is not necessary.

The coated sausages take approximately ten per cent longer to dry than the uncoated, but they do not have to be moistened during the drying process. It has been found that the coating with the hot paraffin or other wax has improved the quality of the sausage both as to appearance and flavor. The coating of wax or paraffin has formed a substantially air tight envelope around the sausage which inhibits evaporation from the surface. This permits a more thorough and uniform curing as the activity or effectiveness of the curing salts varies with the moisture in the sausage, so that in the new method, the curing salts are active through a longer period and also are more uniformly dispersed throughout the sausage during the entire period. In sausage dried in the ordinary manner, the surface dries rapidly so that the surface portion is dry and not readily subject to the action of the curing salts long prior to the satisfactory curing and drying of the center portion, resulting in sausage in which the color and flavor is not uniform. The paraffin or wax coating also permits more uniform drying of the sauasge, as it does not dry rapidly from the outside as in the usual curing, and this prevents the formation of the usual hard shell or rind on the surface of the sausage.

The improvements resulting from my invention are many. It has been found that the color and the surface appearance are better than with sausages dried in the old manner. An important improvement is the fact that the "shelling" of the surface, the formation of a hard, crust-like rind around the outer surface of sausages dried in the old manner, has been eliminated as the surface of the sausage is no longer exposed to the air, and the center, therefore, dries as fast as the outside. It has also been found that the flavor is much better than in sausage prepared under the old method as the cure and texture are more uniform. Sausage cured by this method has the color, flavor and hardness throughout which formerly was secured only in the center of the sausage. There is also less shrink in curing.

I claim:

1. The method of curing dry sausages which comprises coating the uncured sausage with wax and maintaining such coated sausages at drying temperatures until cured.

2. The method of curing dry sausages which comprises stuffing into casings fresh comminuted meat mixed with curing ingredients, coating uncured individual sausages with wax and maintaining such coated sausages at drying temperatures until cured.

3. The method of curing dry sausages which comprises dipping uncured sausage in hot paraffin, permitting the paraffin to set, and maintaining the coated sausage at drying temperatures until cured.

4. The method of curing dry sausages which comprises stuffing into casings fresh comminuted meat mixed with curing ingredients, dipping uncured individual pieces in hot paraffin, permitting the paraffin to set, and maintaining such coated sausages at drying temperatures until cured.

AUGUST KELLERMANN.